K. BANGERT.
APPARATUS FOR MEASURING RÖNTGEN RAYS.
APPLICATION FILED JUNE 9, 1914.
1,181,423.                                           Patented May 2, 1916.
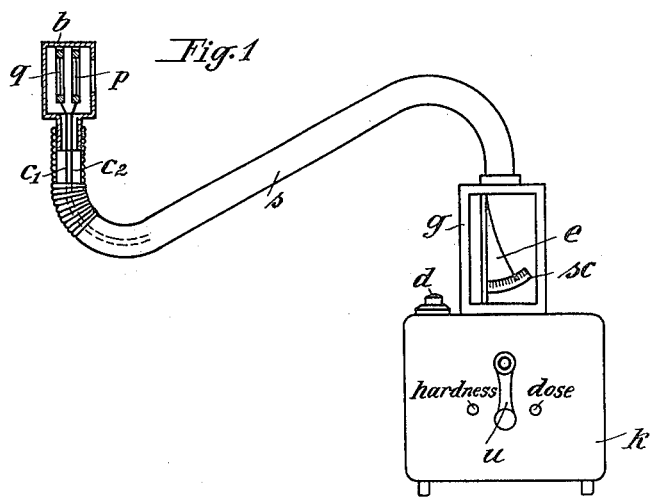
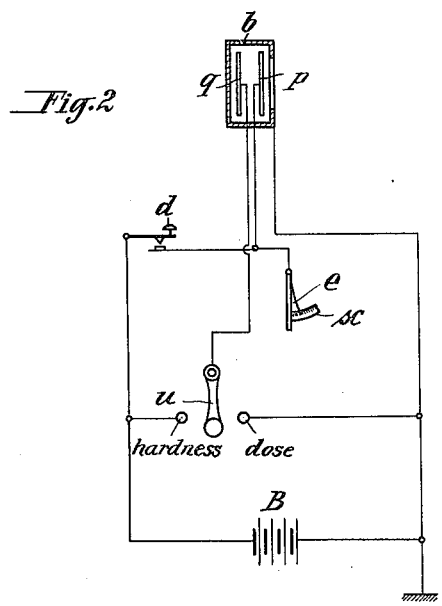

UNITED STATES PATENT OFFICE.

KARL BANGERT, OF BERLIN-CHARLOTTENBURG, GERMANY, ASSIGNOR TO SIEMENS & HALSKE A.-G., OF SIEMENSSTADT, NEAR BERLIN, GERMANY, A CORPORATION OF GERMANY.

APPARATUS FOR MEASURING RÖNTGEN RAYS.

1,181,423.

Specification of Letters Patent. Patented May 2, 1916.

Application filed June 9, 1914. Serial No. 844,104.

*To all whom it may concern:*

Be it known that I, KARL BANGERT, a German citizen, and resident of Berlin-Charlottenburg, Germany, have invented certain new and useful Improvements in Apparatus for Measuring Röntgen Rays, of which the following is a specification.

This invention relates to an electrical instrument for measuring the "hardness" of Röntgen rays and their intensity of radiation or "dose", and consists essentially of a casing and two plates which are insulated from each other and positioned in said casing, an electrical indicating instrument, a current source and certain connections therebetween, whereby according to the connections, said instrument will be made to indicate the hardness and dose of the Röntgen rays which are acting upon said casing and said plates.

The instrument according to my present invention is operated upon the ionization principle, that is to say, its construction is based on that of the so-called ionometer.

In the drawing Figure 1 shows a practical construction of my present measuring instrument and Fig. 2 is a diagram indicating the electrical connections for the same.

A casing $g$ contains an electroscope $e$ and is immediately united with a box $k$ in which a battery B is placed. The reversing switch $u$ is mounted upon the casing $k$ and may be thrown into two positions which are designated by the legends "hardness" and "dose". Also a push-button $d$ is provided at the upper part of the box $k$. A metal hose $s$ carries at one of its ends a chamber $b$ which during measuring is exposed to the Röntgen rays to be tested. At the other end this metal hose is fixed upon the casing $g$ containing the electroscope $e$. Two plates $p$ and $q$ which are insulated from one another are mounted within the chamber $k$ and connected over conductors $c_1$ and $c_2$ running through the hose $s$ with the reversing switch $u$ and the electroscope $e$. Finally the casing of the chamber $b$ is connected over the metal hose $s$ and the casings $g$ and $k$ of the instruments with the ground, as indicated by the wiring diagram of Fig. 2.

As can be seen from the diagram of Fig. 2 for measuring the hardness of the rays the switch $u$ is thrown into the left position designated by the legend "hardness". In this position the one plate $q$ is brought upon the potential of the battery B, while the casing of the chamber $b$ is in connection with the ground and the plate with the electroscope $e$. According to the hardness of the Röntgen rays entering into the chamber $b$ through the window therein the metal plate $p$ will be permeated in a different degree and therewith the electroscope $e$ will be caused to deflect according to the hardness of the rays at a time acting upon the plates $p$ and $q$, the deflection of the electroscope $e$ being indicated at the scale $sc$.

As long as the Röntgen rays do not pass through the chamber, the plate $p$ assumes a definite potential which lies between the potential of the plate $q$ and that of the housing. If now the rays pass through the chamber, the air in the forward half of the chamber, that is to say, the space between the housing and plate $p$ is ionized by the rays. The same is true in a lesser degree as to the rear half of the chamber, that is to say, between the plates $p$ and $q$. According to the hardness of the rays to be investigated, they penetrate the plates more or less and the ionization is increased or decreased in the rear space. According to the relation of the strength of the ionizing current in the two chambers, the intermediate potential of the space separating the plates $p$ varies. This potential is a measure for the hardness of the radiation.

In order to measure the dose of the Röntgen rays, the switch $u$ is merely thrown into the position designated with "dose", that is to the right side position, whereby the plate $q$ and the casing of the ray chamber is brought to the earth's potential, while the electroscope $e$ is connected to the plate $p$. By pressing the push button $d$ a charge will be imparted to the electroscope and the plate $p$ connected therewith. After said push button is opened the charge imparted to the plate $p$ will decrease under the conducting influence of the Röntgen rays. This decreasing corresponds to the quantity and to the hardness of the rays and indicates thus the value of the dose of the rays on a properly graduated scale.

Having thus described my invention I claim as new and desire to secure by Letters Patent of the United States:—

1. Apparatus for measuring Röntgen rays, comprising a casing, an electric current source, an indicating instrument, and a pole changing over switch, all these parts arranged in said casing, an ionization chamber connected to the casing, a plurality of conducting means insulated from each other and arranged in said chamber, and conductors connecting the insulated means of the ionization chamber with the changing over switch, the electric current source and the indicating instrument.

2. Apparatus for measuring Röntgen rays, comprising a casing, an electric current source, an indicating instrument, and a pole changing over switch, all these parts arranged in said casing, an ionization chamber connected to the casing, a plurality of conducting means insulated from each other and arranged in said chamber, and conductors connecting one of the insulated means in the ionization chamber to one pole of the source of current, another means to the indicating instrument and a third means with the pole changing over switch.

3. Apparatus for measuring Röntgen rays, comprising a pair of conducting plates insulated from each other, an ionization chamber insulated from said plates and surrounding the same, a permanent ground-connection for said chamber, an electric indicating device permanently connected to one of said plates, an electric current source, and switching means for establishing at will a circuit over said other plate, said current source and said chamber, or a circuit over said second plate, said chamber and ground and for temporarily also establishing a circuit over said first plate and said current source.

4. Apparatus for measuring Röntgen rays, comprising an ionization chamber containing two insulated plates, a current source having one of its poles permanently connected to ground, a ground connection for the one of said plates which is positioned away from the source of the rays to be tested, an indicating instrument permanently connected to the other of said plates and switching means for temporarily connecting said latter plate with the other pole of said current source.

5. Apparatus for measuring Röntgen rays, comprising a casing, an electric current source, an indicating instrument, a pole changing over switch, and a single pole switch, all these parts arranged in said casing, an ionization chamber conductively connected by a flexible hose to the casing, a pair of conducting plates arranged in said ionization chamber and insulated from each other and from the chamber, conductors connecting the insulated plates of the ionization chamber with both the switching means, the electric current source and the indicating instrument, and a ground connection for one pole of the current source and for the casing.

6. Apparatus for measuring Röntgen rays, comprising a casing, an electric current source, an indicating instrument, a pole changing over switch, and a single pole switch, all these parts arranged in said casing, an ionization chamber connected to the casing, a plurality of conducting means insulated from each other and arranged in said chamber, and conductors connecting the insulated means of the ionization chamber with both the switching means, the electric current source and the indicating instrument.

7. Apparatus for measuring Röntgen rays, comprising a casing, an electric current source, an indicating instrument, and a pole changing over switch, all these parts arranged in said casing, an ionization chamber conductively connected by a flexible hose to the casing, a pair of conducting plates arranged in said ionization chamber and insulated from each other and from said chamber, and conductors connecting the insulated plates and the chamber with the electric current source, the changing over switch and the indicating instrument, and a ground connection for one pole of the current source and for the casing.

8. Apparatus for measuring Röntgen rays, comprising a casing, an electric current source, an indicating instrument, a pole changing over switch, and a single pole switch, all these parts arranged in said casing, an ionization chamber connected conductively by a flexible hose to the casing, a pair of conducting plates arranged in said chamber and insulated from each other and from said chamber, conductors connecting one of said plates, which is positioned next to the source of the rays to be tested, with the indicating instrument and with the single pole switch, and the second conducting plate with the lever of the changing over switch, and ground connections for one pole of the current source and for the casing.

In testimony whereof I have hereunto set my signature in the presence of two subscribing witnesses.

KARL BANGERT.

Witnesses:
WOLDEMAR HAUPT,
HENRY HASPER.